(12) United States Patent
Tain et al.

(10) Patent No.: US 7,205,719 B2
(45) Date of Patent: Apr. 17, 2007

(54) LIGHT SOURCE WITH LED AND OPTICAL PROTRUSIONS

(75) Inventors: Ra-Min Tain, Jhonghe (TW); Hei-Tong Ching, Taipei (TW); Chin-Lung Chen, Hsinchu (TW); Rong-Chang Fang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 326 days.

(21) Appl. No.: 11/023,692

(22) Filed: Dec. 27, 2004

(65) Prior Publication Data

US 2006/0138951 A1   Jun. 29, 2006

(51) Int. Cl.
H05B 33/00    (2006.01)

(52) U.S. Cl. .................... 313/512; 362/234; 362/227; 362/30; 313/11

(58) Field of Classification Search ................ 313/112, 313/512, 11; 362/234–237, 227, 249, 30
See application file for complete search history.

(56) References Cited

U.S. PATENT DOCUMENTS

| 6,608,614 B1 | 8/2003 | Johnson ...................... 345/102 |
| 6,666,567 B1 | 12/2003 | Feldman et al. ............ 362/237 |

*Primary Examiner*—Joseph Williams
(74) *Attorney, Agent, or Firm*—Jiang Chyun IP Office (57) ABSTRACT

A light source with LED and optical protrusions is provided. It comprises an optical panel and at least one optical plate. The light source can be used together with a heat sink or an optical element to enhance its performance. The optical panel forms an optical surface having plural optical protrusions to reflect and mix lights emitted from the LEDs. The optical plate is inserted into at least one slot on the optical panel, and it comprises a heat dissipation core plate and at least one electric circuit layer. The electric circuit layer comprises LEDs and at least one control circuitry. The electric circuit layer can be attached to either single side or both sides of the heat dissipation core plate. The invention achieves good uniformity and high intensity of the combined lights with desired chromaticity.

23 Claims, 9 Drawing Sheets

LIGHT SOURCE WITH LED AND OPTICAL PROTRUSIONS

FIELD OF THE INVENTION

The present invention generally relates to a light emitting diode (LED) lighting system, and more specifically to a light source with LED and optical protrusions.

BACKGROUND OF THE INVENTION

A light source for illuminating an information source is often required in many applications. In particular, liquid crystal displays (LCDs) have become more and more popular in many electronic media. LCDs are commonly adopted in various applications, such as laptop computers, display monitors, video cameras, automatic teller machine displays, displays in avionics, televisions etc. In general, a backlight module is required for the LCDs to illuminate the information to be displayed. There are various kinds of light sources used in a backlight module of an LCD, e.g., fluorescent lamps and LEDs. While the fluorescent lamps are inexpensive and do not need a complex control circuitry, they are sometimes inadequate for certain applications that require good color quality and long lamp life. LEDs have been proposed for use as light sources, such as LCD backlight modules, for many reasons. These advantages of LED light sources include long life, ease of replacement, robust mechanical property, and better color quality than fluorescent lamps. Certain applications (e.g., avionics) require a specific chromaticity of light emitted from the LCD backlight module. However, most commercially available LEDs are made with a limited number of chromaticity choices and their chromaticity may change over time.

Figure 1:
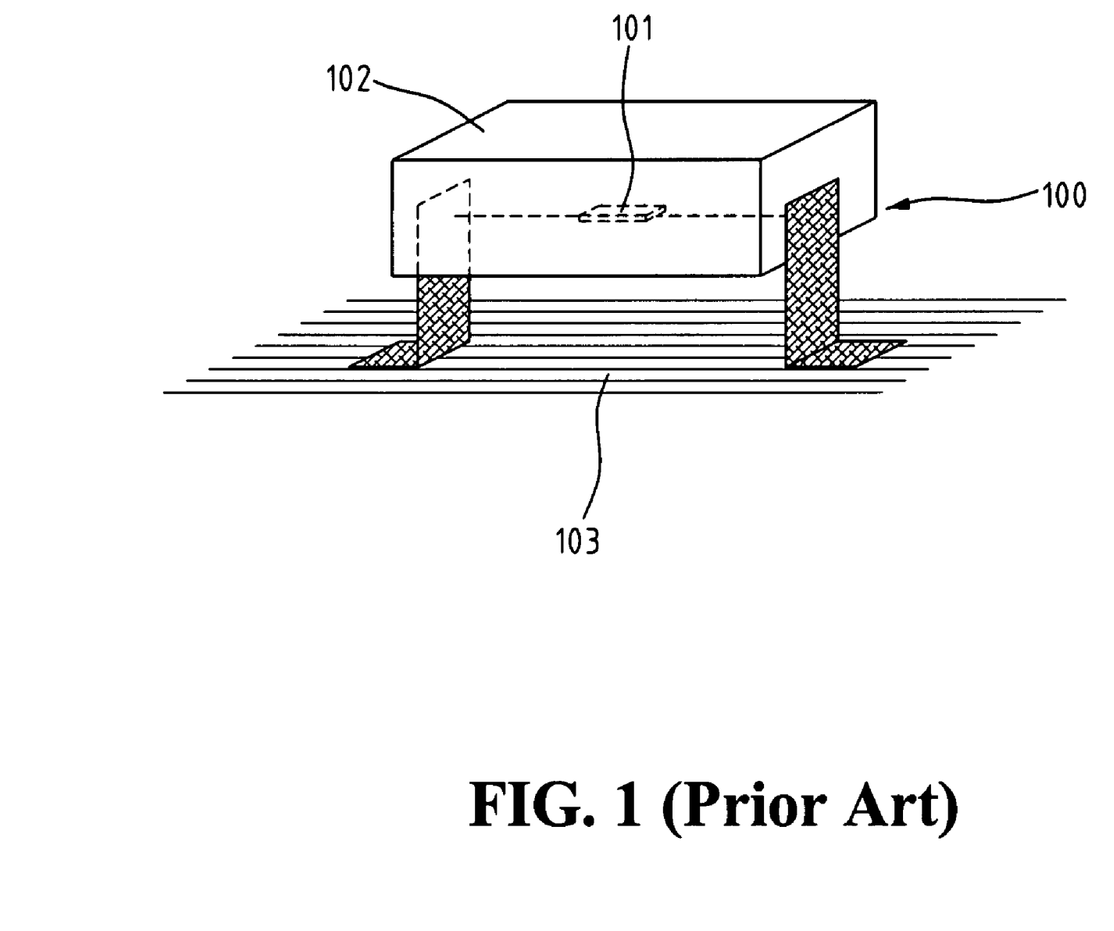
FIG. 1 shows a conventional raised LED structure.

An LED light source with a raised LED 100, as shown in FIG. 1, to improve the chromaticity of a combined light was disclosed in U.S. Pat. No. 6,666,567. The raised LED 100 includes an LED diode 101 encased in a package 102 which is raised above the floor 103 of optical cavities. The raised structure permits light to be emitted from the base of the LED. Additionally, reflective protrusions may be placed beneath the raised LED to aid in redirecting the light trajectory. A combination of fluorescent lamps and LEDs were also proposed to form a hybrid light source. However, all these schemes increase the complexity and cost of the light source.

Figure 2:
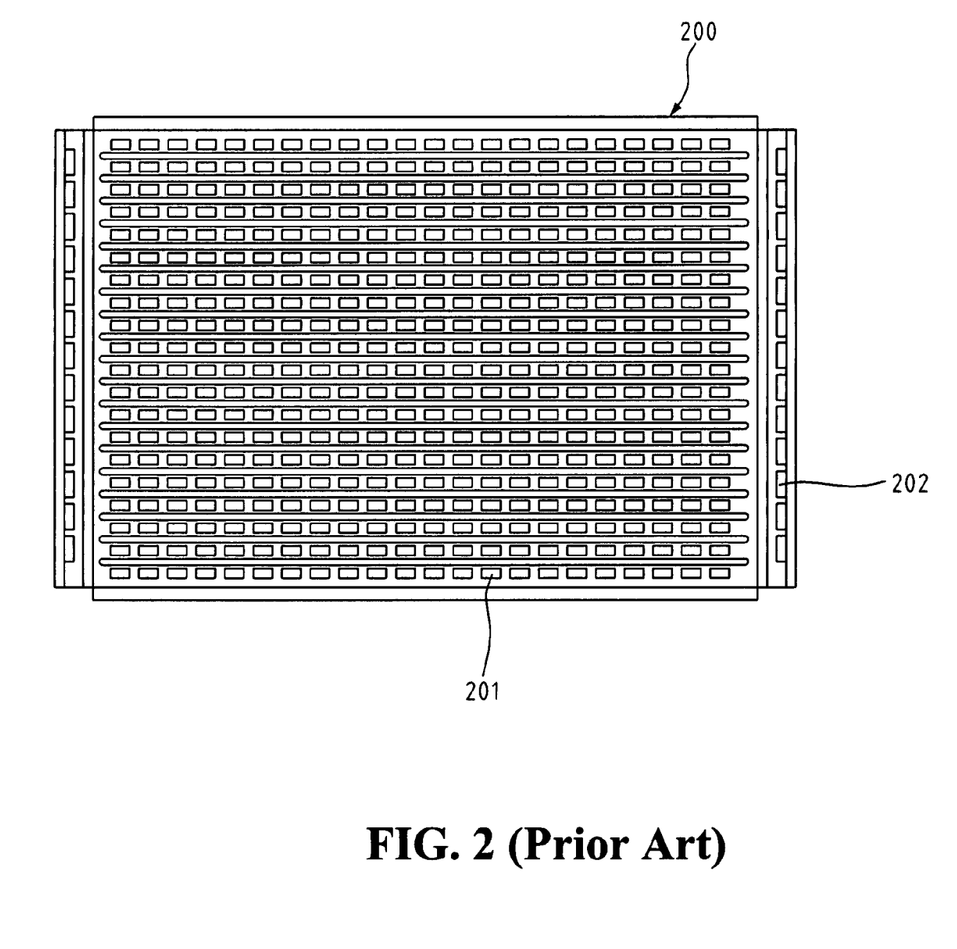
FIG. 2 shows a conventional LED-based LCD backlight.
Figure 3:
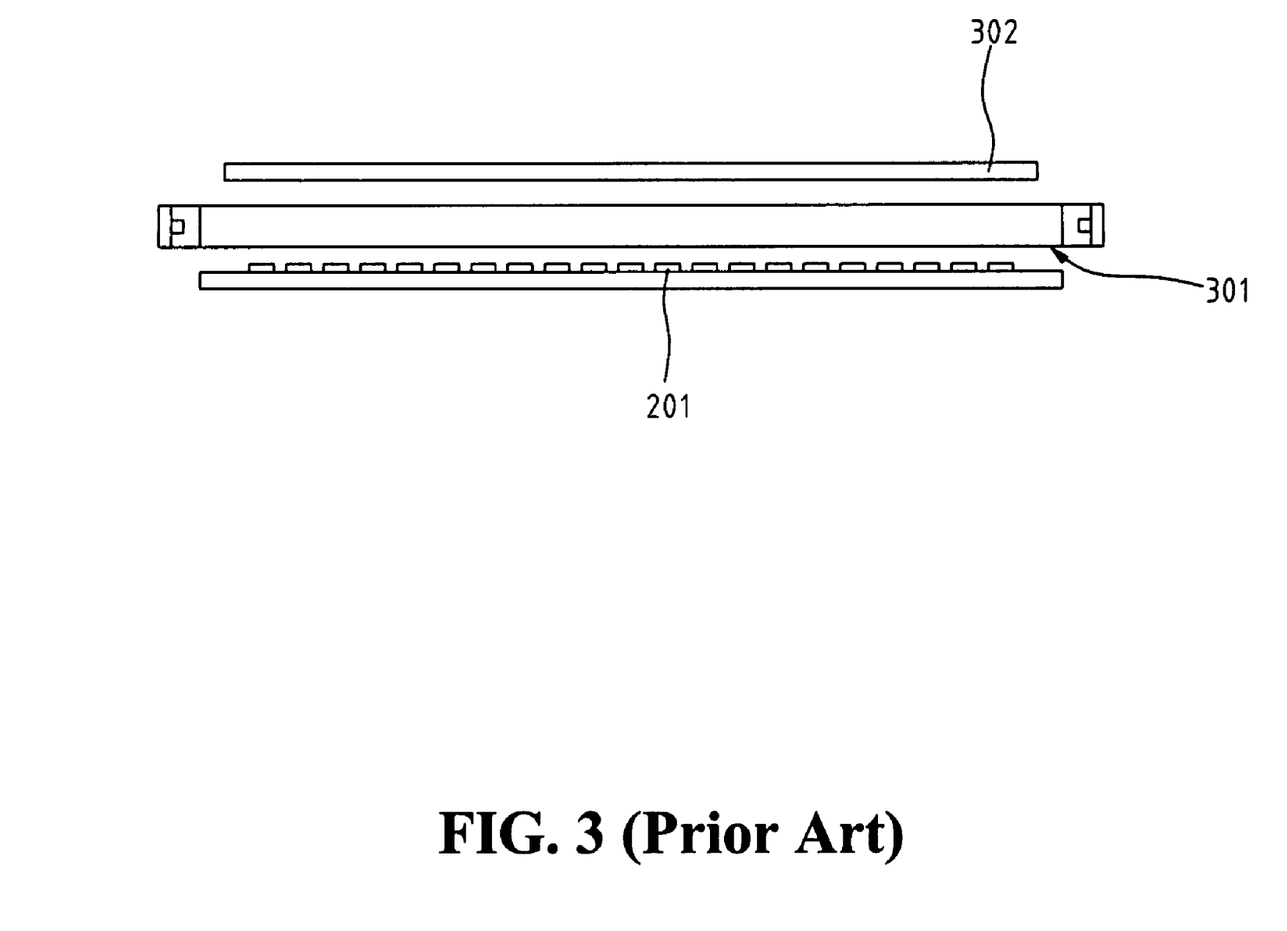
FIG. 3 shows a side elevational view of the LCD backlight shown in FIG. 2.

As shown in FIG. 2 and FIG. 3, an LCD backlight 200, which includes a first LED array 201 that provides light with a first chromaticity and a second LED array 202 that provides light with a second chromaticity, was disclosed in another U.S. Pat. No. 6,608,614. The lights emitted from these two LED arrays 201 and 202 are combined through a combining element 301 (e.g., a wave guide) and then projected towards an LCD stack 302. The LED chip normally emits light in a direction which is approximately perpendicular to the chip surface. The directions of light emitted from the first and the second LED arrays are approximately perpendicular and parallel to the panel surface, respectively. A separate combining element 301 is required in this light source. The chromaticity of the combined light can only be adjusted by changing the chromaticity of the second LED array 202 through a control system (not shown). Therefore, there is a limited flexibility for chromaticity adjustment.

Figure 4:
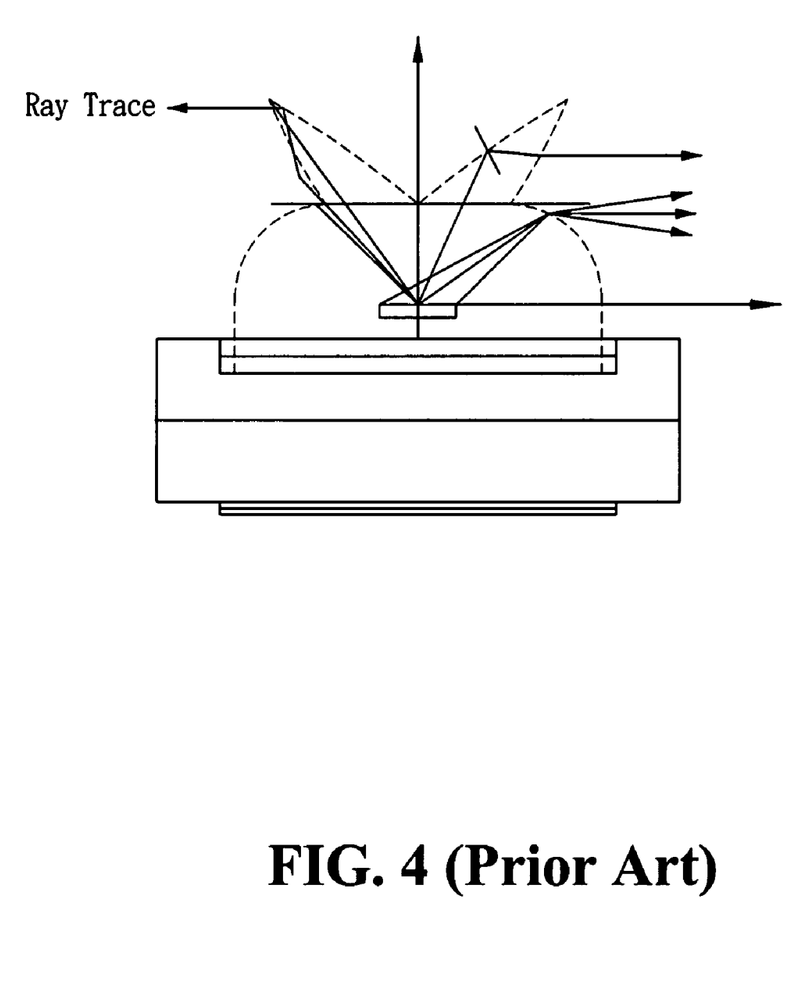
FIG. 4 shows a Luxeon side-emitter.

According to another prior art, a Luxeon side-emitter having packaged LED chips was disclosed, as shown in FIG. 4. The side-emitter may provide good uniformity of combined light but the light intensity is poor. In addition, packaged LED chips normally occupy a much larger area than the bare chips scheme of the present invention.

It is known that the majority of lights emitted from LED chips travel in a direction approximately perpendicular to the chip surface. Therefore, the LED chips need to be arranged in a way such that the lights emitted from different LED chips have a chance to be combined and mixed in order to achieve desired chromaticity before they reach a display screen. It is the main objective of the present invention to use a low complexity and low cost system to achieve high intensity and good color quality.

SUMMARY OF THE INVENTION

The present invention has been made to achieve the advantages of a practical LED light source. The primary object is to provide a light source with LED and optical protrusions. It eliminates the need of a package for encasing an LED chip, and thus reduces cost and space. The high intensity is also achieved due to a high LED packaging density.

In the first embodiment of the invention, the LED light source comprises an optical panel and at least one optical plate. This LED light source can be used together with a heat sink to enhance its performance. The optical panel forms an optical surface having plural optical protrusions to reflect and combine lights that are emitted from the LED. The optical plate is inserted into at least one slot on the optical panel. The optical plate comprises a heat dissipation core plate and at least one electric circuit layer. One electric circuit layer comprises at least one LED and at least one control circuitry which is designed to control the operation of the bare LED chips.

In the second embodiment, the LED light source further includes an optical element that is used to guide said combined light towards a display screen. The optical element may be a light diffuser or a wave guide.

The optical plate includes a heat dissipation core plate and two electric circuit layers. One electric circuit layer is attached to each side of the heat dissipation core plate. Alternatively, the optical plate includes a heat dissipation core plate and one electric circuit layer. The electric circuit layer is attached to single side of the heat dissipation core plate.

According to the invention, the LEDs are attached to an electric circuit layer via a flip chip or wire bonding. The LEDs are attached in a way such that their chip surfaces face the optical protrusions. Therefore, the emitted lights from different LEDs have a chance to be reflected and combined on the optical surface in order to achieve desired chromaticity before they reach a display screen. These LEDs can be encapsulated with a transparent material to prevent the LEDs from reacting with air. The control circuitry is used to power up the LEDs, to control the brightness of the LEDs, to provide electrostatic discharge protection for the LEDs, and to adjust the chromaticity of the combined light to meet desired applications. The control circuitry may be stacked or printed on the electric circuit layer.

Simulation results indicate that good uniformity and high intensity of combined lights with desired chromaticity are achieved. The combined lights can be further directed towards a light diffuser or a wave guide. Moreover, the heat dissipation core plates are normally connected to a heat sink to enhance dissipation of heat, and thus enhance the performance and increase the life time of the light source. The LED light source of this invention can be used as a backlight module for a liquid-crystal display.

The foregoing and other objects, features, aspects and advantages of the present invention will become better understood from a careful reading of a detailed description provided herein below with appropriate reference to the accompanying drawings.

DETAILED DESCRIPTION OF THE PREFERRED EMBODIMENTS

Figure 5A:
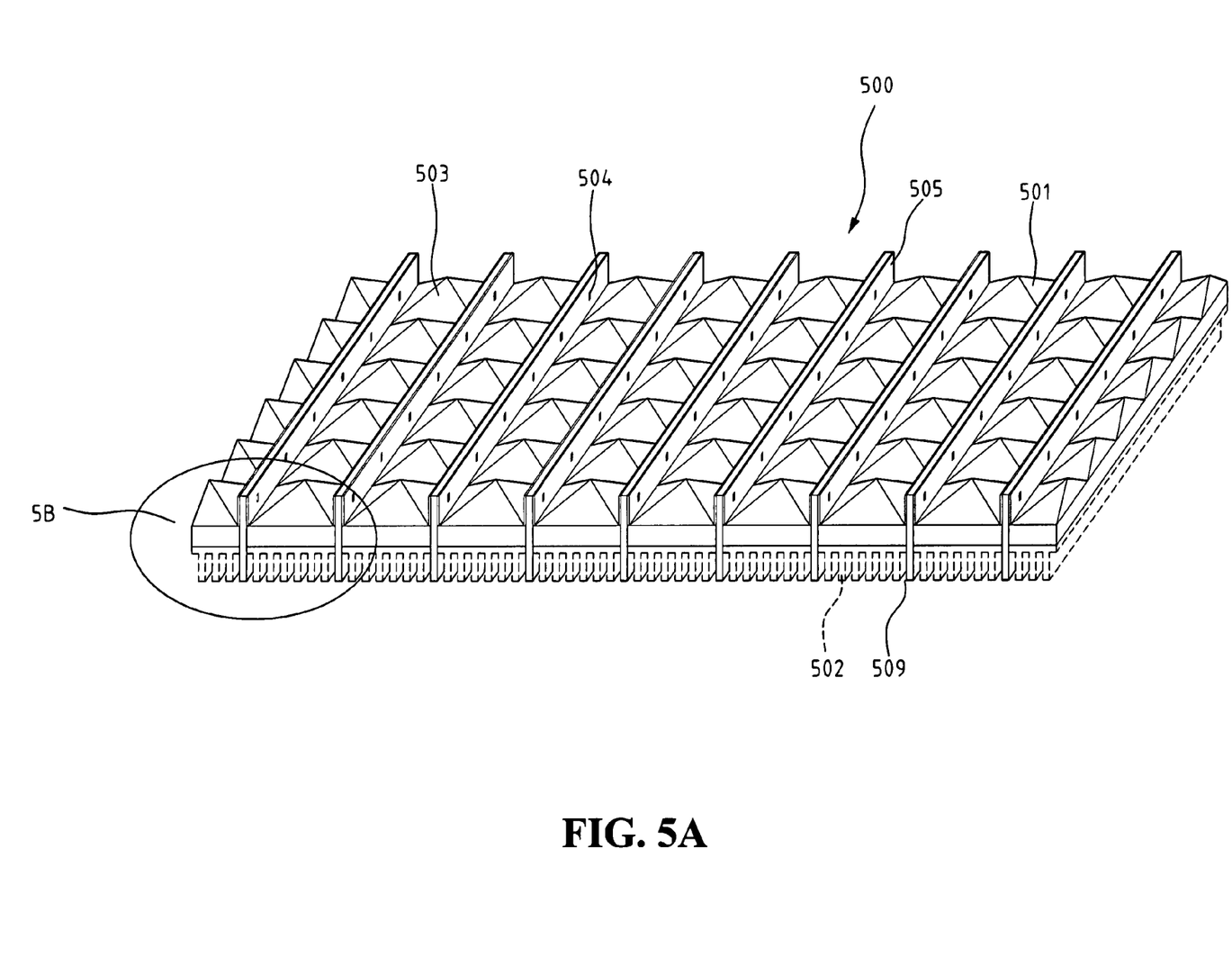
FIG. 5A shows a top view of a light source with LED and optical protrusions according to a first embodiment of the present invention.
Figure 5B:
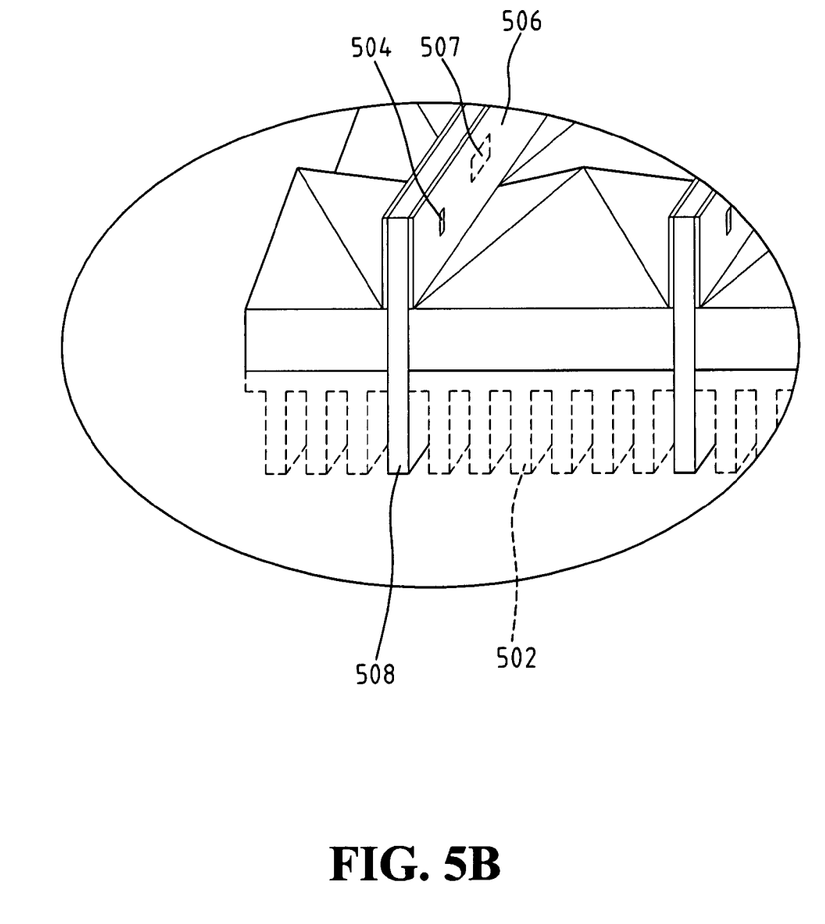
FIG. 5B is an enlarged view of the optical plate in FIG. 5A.

FIG. 5A and FIG. 5B depict a preferred embodiment of a light source 500 with LED and optical protrusions according to the present invention. Referring to FIG. 5A, the light source 500 comprises an optical panel 501 and at least one optical plate 505. The optical panel 501 forms an optical surface having plural optical protrusions 503 to reflect and combine lights that are emitted from LEDs 504 and travel approximately in parallel to the surface of the optical panel 501. The optical plate 505 is inserted into at least one slot 509 on the optical panel 501. The slot may span from one panel edge to another. This light source 500 can be used together with a heat sink to enhance its performance. For example, a heat sink (shown in dotted line) 502 is attached to the optical panel 501 to enhance heat dissipation.

As shown in FIG. 5B, the optical plate 505 further comprises a heat dissipation core plate 508 and at least one electric circuit layer which is attached to the heat dissipation core plate 508. One electric circuit layer 506 further comprises at least one LED 504 and at least one control circuitry 507 which is designed to control the operation of the bare LED chips 504.

The combined lights can be further directed towards a light diffuser or a wave guide (not shown). Moreover, the heat dissipation core plates 508 are usually connected to the heat sink 502 to enhance the dissipation of heat, and thus enhance the performance and increase the life time of the light source 500. The light source 500 of this invention can be used as a backlight module for a liquid-crystal display. The light source 500 eliminates the need of a package for encasing an LED chip, and thus reduces cost and space. However, this light source do not prohibit using packaged LED lamps and should not be limited to the use of bare LED chips only.

One electric circuit layer 506 is attached to each side of the heat dissipation core plate 508, and the LEDs 504 on the electric circuit layer 506 are exposed on the optical surface to emit lights. The LEDs 504 are attached to the electric circuit layer 506 in a way such that their chips surfaces face the optical protrusions 503. Therefore, the majority of lights are emitted towards the optical protrusions 503, which are then reflected and combined by the optical protrusions 503 on the optical surface. Alternatively, only single side of the heat dissipation core plate 508 is attached with an electric circuit layer 506. Adjacent LEDs are allowed to emit lights of different or same colors depending on desired applications.

The control circuitry 507 is used to power up the LEDs 504, to control the brightness of the LEDs 504, to provide electrostatic discharge protection for the bare LED chips 504, and to adjust the chromaticity of the combined light to meet desired applications. The control circuitry 507 may be stacked or printed on the electric circuit layer 506.

Figure 6:
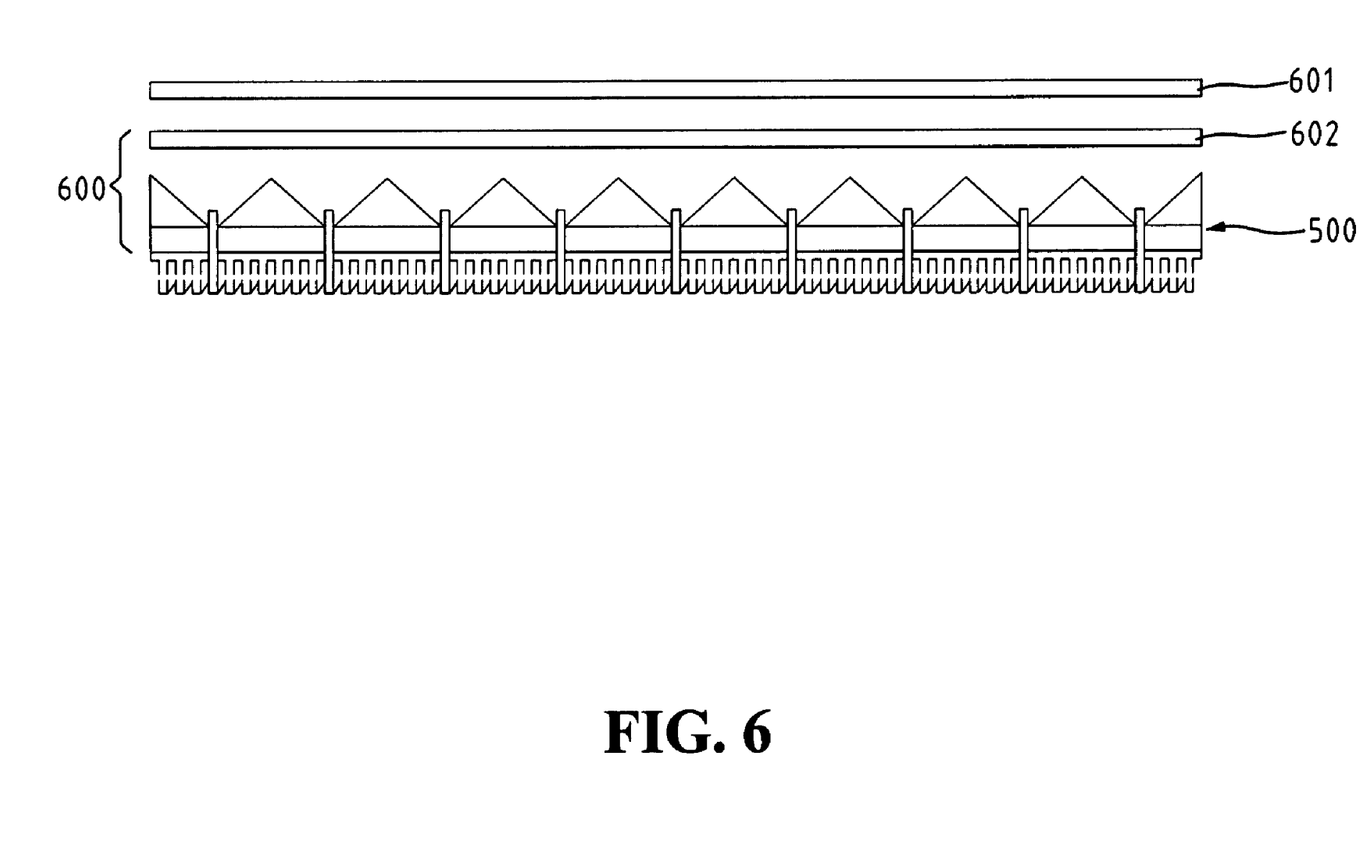
FIG. 6 shows a second embodiment of a light source with LED and optical protrusions according to the present invention.

FIG. 6 shows a second embodiment of a light source 600 with LED and optical protrusions according to the present invention, wherein an optical element 601 is placed in between a display screen 602 and the light source 500 shown in FIG. 5A. The optical element 601 is used to guide the combined light towards the display screen 602 such as an LCD stack. The optical element 601 may be a light diffuser or a wave guide.

According to desired applications, the optical protrusions can be formed in any suitable manner and shape and made of any suitable material. The shape of the optical protrusions can be, but not limited to, pyramidal or conic or parabolic or semispherical. The electric circuit layer is made of an insulating layer, such as printed circuit board (PCB), oxide and ceramic material. These LEDs can be encapsulated with a transparent material to prevent the LEDs from reacting with air. Furthermore, total reflection can be avoided if the refractive index of the transparent material is properly selected. The transparent material can be chosen from the group of, but not limited to, epoxy and silicone. The heat dissipation core plate can be made of a material chosen from the group of a dielectric material, an electrical conductor, and a thermal conductor.

Figure 7A:
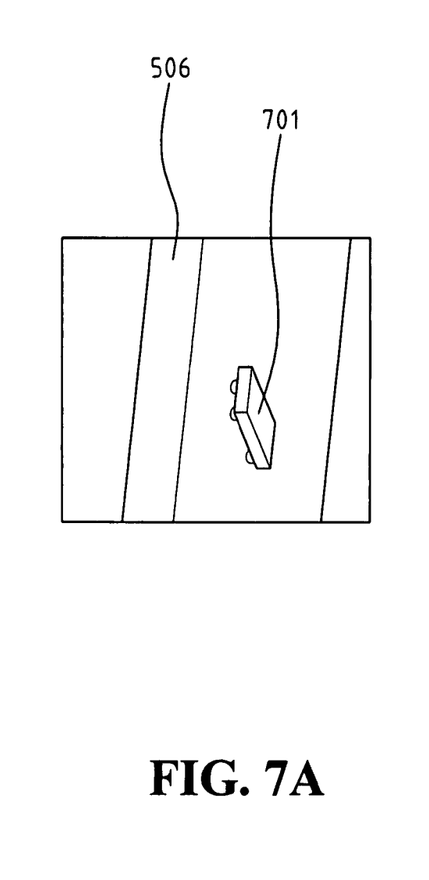
FIG. 7A shows a flip chip bonding.
Figure 7B:
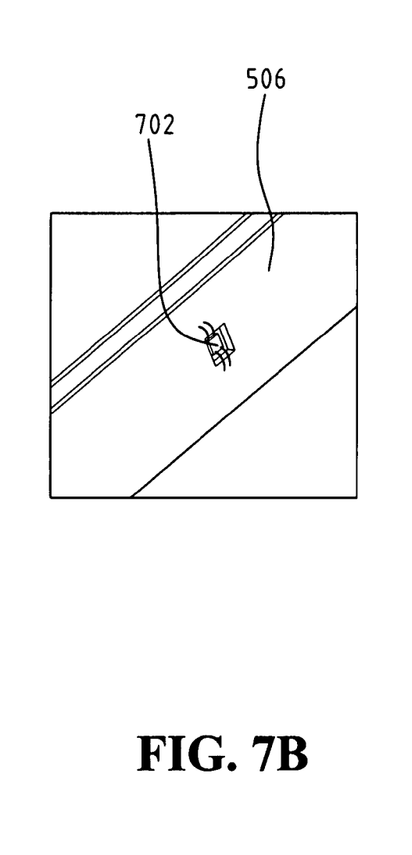
FIG. 7B shows an edge wire bonding.
Figure 7C:
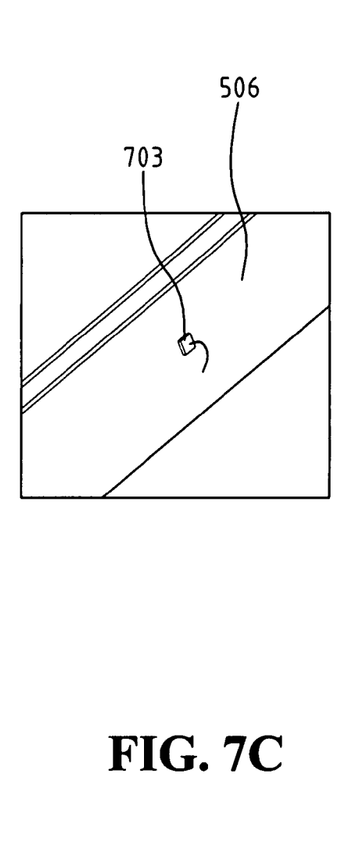
FIG. 7C shows a center wire bonding.

According to the invention, the LEDs are attached to the electric circuit layer via a flip chip or wire bonding. FIG. 7A shows a flip chip bonding, wherein an LED chip 701 is bonded onto a substrate (i.e., electric circuit layer 506) with paste or solder. The flip chip bonding eliminates the need of a conventional wire bonding which is used to electrically connect the chip to an external circuitry. The bonding pads of a flip chip are also served as electrical connections to the control circuitry. The flip chip bonding is often adopted for applications that require a small form factor or have a high density of bonding pads. The wire bonding further includes edge wire bonding and center wire bonding. FIGS. 7B and 7C show an edge wire bonding and a center wire bonding, respectively. Wherein an LED chip 702 or 703 is first bonded onto a substrate (i.e., electric circuit layer 506) with paste or solder, and then metal wire bonding is followed to complete the electrical connections to the control circuitry.

Figure 8:
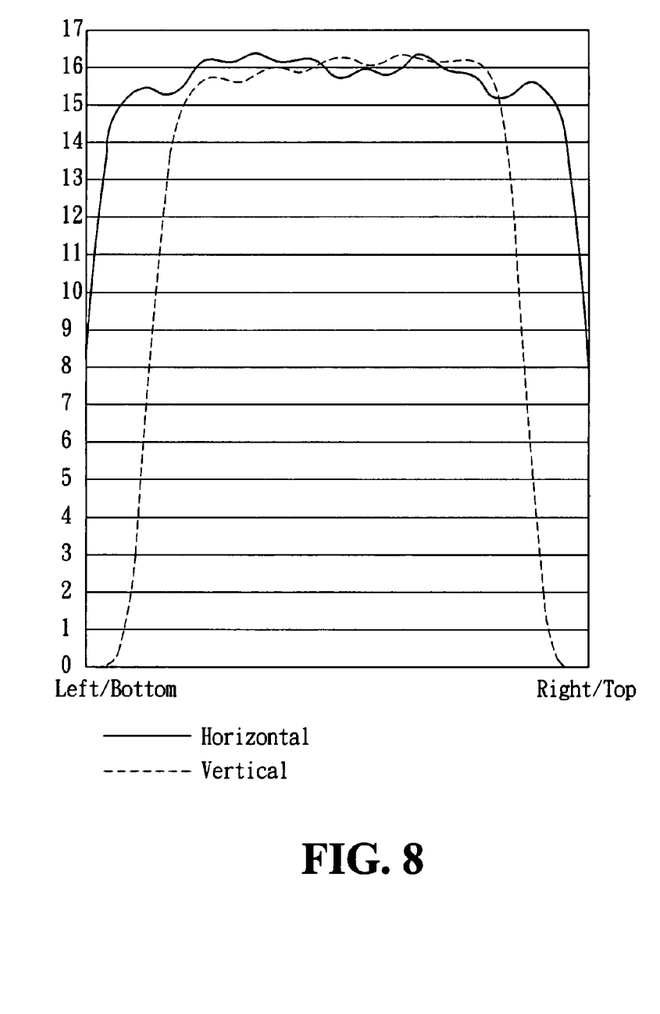
FIG. 8 shows the intensity of the combined light from left/bottom to right/top of a screen surface.

In a simulated RGB color map of a combined light at a screen surface, it shows that the chromaticity of the combined light using the light source with LED and optical protrusions according to the invention well matches a targeted white color. The light intensity is also higher than that can be achieved with the conventional schemes. FIG. 8 further shows the intensity of the combined light from left/bottom to right/top of the screen surface. The horizontal axis represents the location on the screen. The solid line represents the horizontal component of the light intensity and the dashed line represents the vertical component of the light intensity. The results indicate that good uniformity and high intensity of the combined lights with desired chromaticity are achieved in both horizontal and vertical directions.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A light source with light emitting diode (LED) and optical protrusions, comprising:
    an optical panel having at least one slot thereon and plural optical protrusions to reflect and combine lights; and
    at least one optical plate inserted into said at least one slot on said optical panel, each optical plate having a heat dissipation core plate and at least one electric circuit layer, each said electric circuit layer having at least one LED and at least one control circuitry to control the operation of said LED.

2. The light source with LED and optical protrusions as claimed in claim 1, wherein said LED is bare LED chip that is encapsulated with a transparent material.

3. The light source with LED and optical protrusions as claimed in claim 2, wherein said transparent material is chosen from the group of epoxy and silicone.

4. The light source with LED and optical protrusions as claimed in claim 1, wherein said LED is an LED package.

5. The light source with LED and optical protrusions as claimed in claim 1, wherein said heat dissipation core plate is made of a material chosen from the group of a dielectric material, an electrical conductor, and a thermal conductor.

6. The light source with LED and optical protrusions as claimed in claim 1, wherein the shapes of said optical protrusions include pyramidal, conic, parabolic, and semispherical shapes.

7. The light source with LED and optical protrusions as claimed in claim 1, wherein said electric circuit layer is an insulating layer.

8. The light source with LED and optical protrusions as claimed in claim 1, wherein said control circuitry is stacked on said electric circuit layer.

9. The light source with LED and optical protrusions as claimed in claim 1, wherein said control circuitry is printed on said electric circuit layer.

10. The light source with LED and optical protrusions as claimed in claim 2, wherein said bare LED chips are attached to said electric circuit layer via a flip chip.

11. The light source with LED and optical protrusions as claimed in claim 2, wherein said bare LED chips are attached to said electric circuit layer via wire bonding.

12. The light source with LED and optical protrusions as claimed in claim 2, wherein said bare LED chips are attached to said electric circuit layer in a way such that their chips surfaces face said optical protrusions.

13. The light source with LED and optical protrusions as claimed in claim 1, wherein adjacent said LEDs emit lights of different colors.

14. The light source with LED and optical protrusions as claimed in claim 1, wherein adjacent said LEDs emit lights of same colors.

15. The light source with LED and optical protrusions as claimed in claim 1, wherein each optical plate includes a heat dissipation core plate and two electric circuit layers, and one electric circuit layer is attached to each side of the heat dissipation core plate.

16. The light source with LED and optical protrusions as claimed in claim 1, wherein each optical plate includes a heat dissipation core plate and one electric circuit layer, said electric circuit layer is attached to single side of the heat dissipation core plate.

17. The light source with LED and optical protrusions as claimed in claim 1, wherein said light source further comprises a heat sink that is attached to said optical panel to enhance heat dissipation.

18. The light source with LED and optical protrusions as claimed in claim 1, wherein said light source further comprises an optical element that is used to guide said combined light towards a display screen.

19. The light source with LED and optical protrusions as claimed in claim 7, wherein said electric circuit layer is chosen from the group of printed circuit board, oxide, and ceramic material.

20. The light source with LED and optical protrusions as claimed in claim 18, wherein said optical element is a light diffuser.

21. The light source with LED and optical protrusions as claimed in claim 18, wherein said optical element is a wave guide.

22. The light source with LED and optical protrusions as claimed in claim 18, wherein each optical plate includes a heat dissipation core plate and two electric circuit layers, and one electric circuit layer is attached to each side of the heat dissipation core plate.

23. The light source with LED and optical protrusions as claimed in claim 18, wherein each optical plate includes a heat dissipation core plate and one electric circuit layer, and the electric circuit layer is attached to single side of the heat dissipation core plate.

* * * * *